Sept. 16, 1924.  
J. W. KELLY  
FLUSH VALVE  
Filed Sept. 25, 1922  
1,508,398  
2 Sheets-Sheet 1
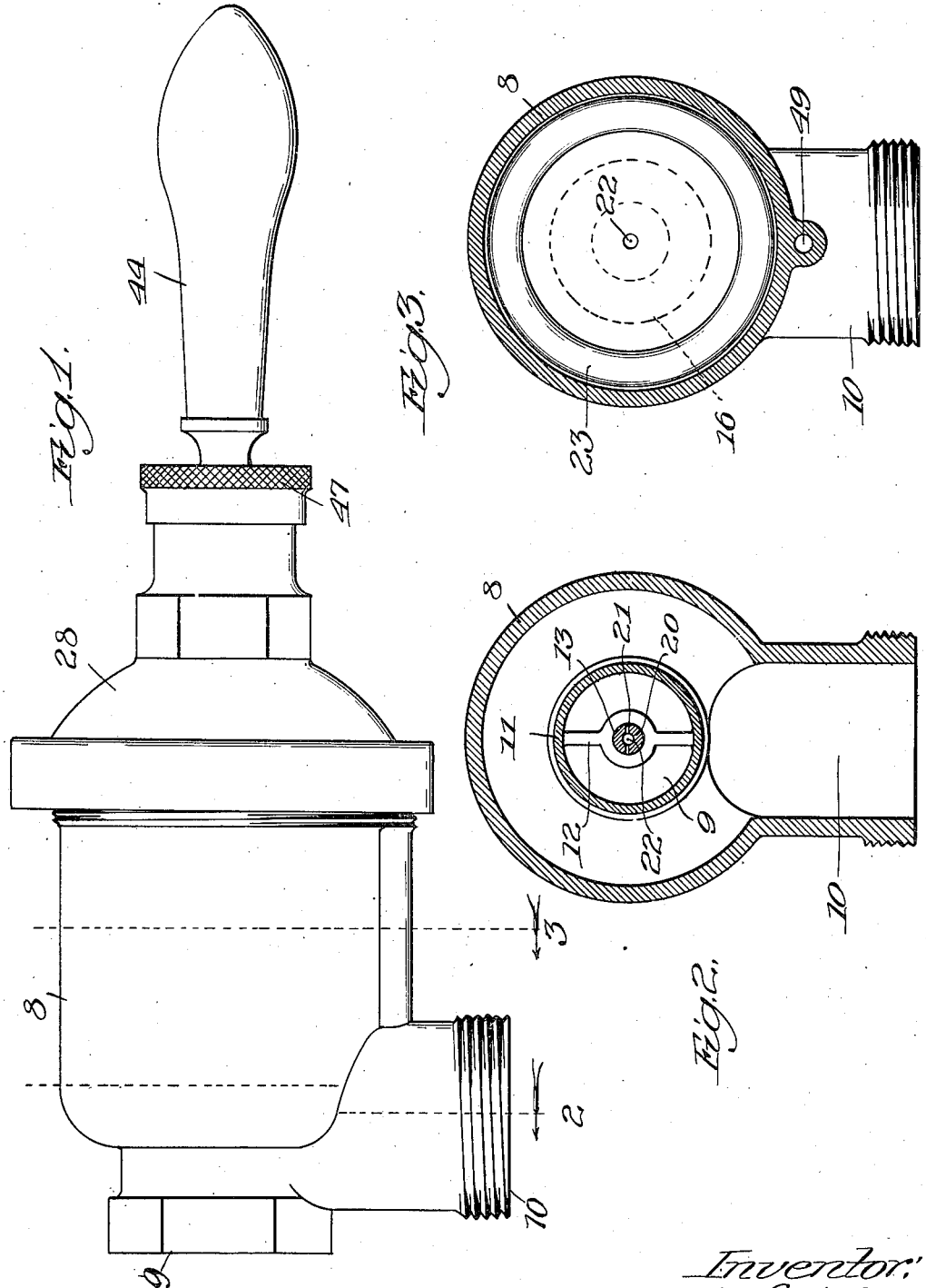

Sept. 16, 1924.  
J. W. KELLY  
1,508,398  
FLUSH VALVE  
Filed Sept. 25, 1922 2 Sheets-Sheet 2
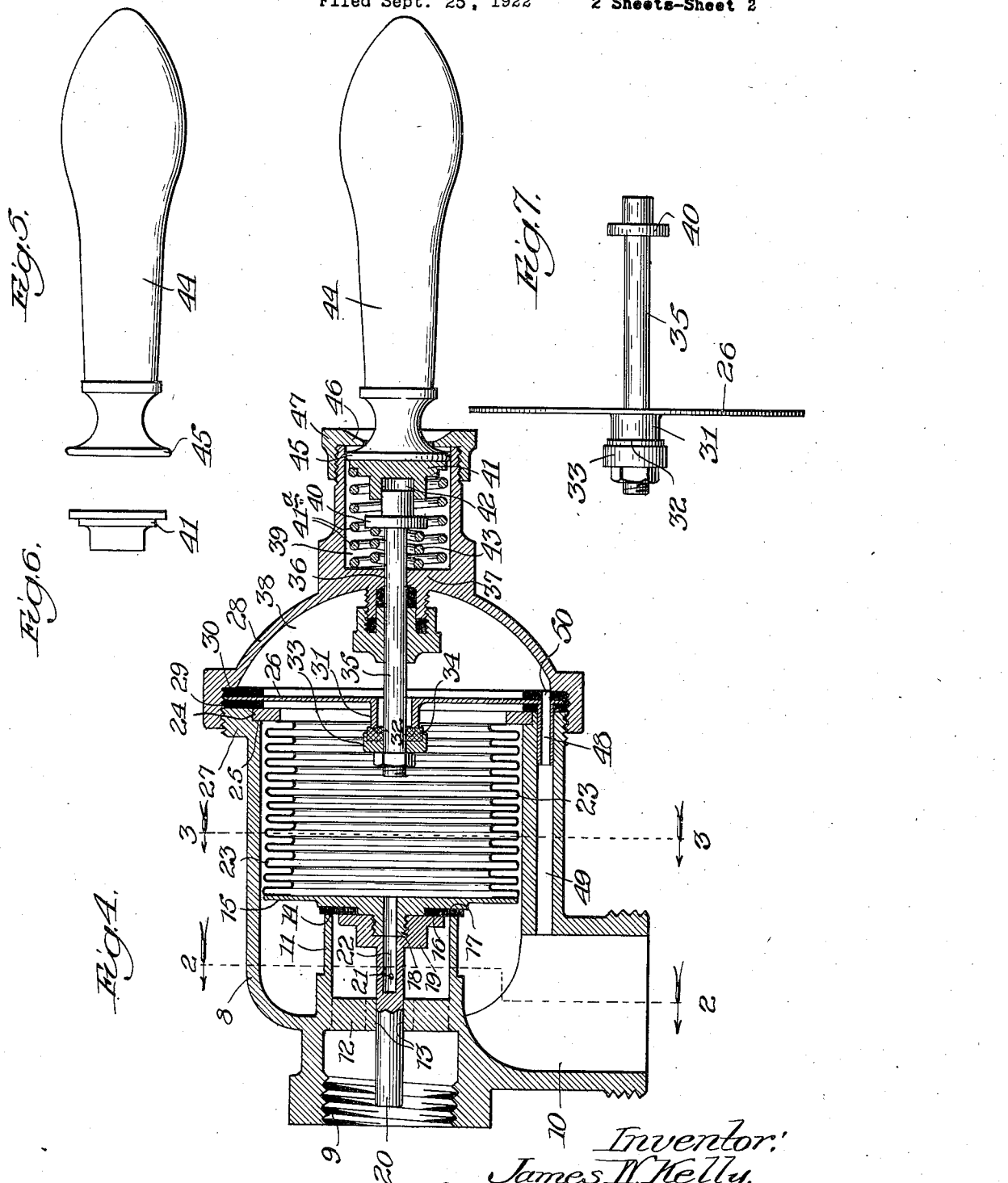
Inventor:
James W. Kelly,
By Dyrenforth, Lee, Chritton & Niles,
Attys.

Patented Sept. 16, 1924.

1,508,398

UNITED STATES PATENT OFFICE.

JAMES W. KELLY, OF CHICAGO, ILLINOIS.

FLUSH VALVE.

Application filed September 25, 1922. Serial No. 590,343.

*To all whom it may concern:*

Be it known that I, JAMES W. KELLY, a citizen of the United States, residing at Chicago, in the county of Cook and State of Illinois, have invented a new and useful Improvement in Flush Valves, of which the following is a specification.

My invention relates to improvements in flush valves of the self-closing type adapted for quick opening and slow closing, the latter to effect the delivery of the desired amount of flushing water.

My primary object is to provide a novel, simple and economical construction of valve of the type above referred to which will be positive in operation and less liable to impairment in use.

Referring to the accompanying drawings:

Figure 1 is a view in side elevation of my improved flush valve. Figure 2 is a section taken at the line 2 on Fig. 1 and viewed in the direction of the arrow. Figure 3 is a section taken at the line 3 on Fig. 1 and viewed in the direction of the arrow. Figure 4 is a view in longitudinal sectional elevation of the valve. Figure 5 is a view in elevation of the handle portion of the valve. Figure 6 is a similar view of one of the parts of the valve device directly cooperating with the handle and through the medium of which one of the valves of the device is operated; and Figure 7, a similar view of the valve operated by the parts shown in Figs. 5 and 6.

The device comprises a casing, represented at 8, containing an inlet 9 for connection with the supply (not shown) of flushing water, and an outlet 10 through which the flushing water is delivered. The casing 8 is formed at its inlet 9 with a tubular extension 11 provided with a spider 12 extending crosswise thereof and centrally apertured at 13, the inner end of the extension 11 forming an annular valve seat which is represented at 14. Cooperating with the seat 14 is a valve shown as comprising a disk 15 located within the casing 8 and provided with a gasket 16 which opposes, and engages, the valve seat 14. The disk 15, annularly shouldered, as represented at 17, to receive the gasket 16, is provided with an externally-threaded boss 18 upon which the enlarged end 19 of the stem 20 of the valve is screwed, the marginal edge of the portion 19 overlapping the gasket 16. The stem 20 is slidable lengthwise in the opening 13 in the spider 12 and contains relatively small openings, represented at 21, two of these openings being provided in the construction shown, which open into a recess 22 opening through the face of the disk 15 opposite that at which the gasket 16 is located.

Cooperating with the valve just described is a water-tight cylindrical bellows, represented at 23, preferably constructed of metal, as for example spring brass, this bellows, which is located within the casing 8, being connected at one end with the disk 15 to afford a water-tight joint therebetween and at its other end with a ring 24 set into an annular groove 25 in the wall of the casing 8. This end of the casing 8 is closed by a disk 26 clamped at its peripheral edge in place, between opposing surfaces of the sections 27 and 28 forming the casing 8, gaskets 29 and 30 being provided to render the joint water-tight. The disk 26 is provided with an inwardly-extending tubular boss 31 the extremity of which, represented at 32, affords an annular seat for a valve shown as formed of a valve disk 33 carrying a gasket 34 to engage the seat 32, and a valve stem 35 on which this disk and gasket are carried, this valve rod extending loosely through the opening afforded by the tubular boss 31 and sliding in an opening 36 in a stuffing box 36ª secured at an opening in a partition 37 provided in the casing section 28 and dividing the interior of the latter into the chambers 38 and 39. The outer end of the valve stem 35, which is provided with an annular flange 40, extends into the chamber 39 and carries a head 41 into a socket 42 in which the outer end of the valve stem 35 extends. The valve 33 is normally held in closed position by a coil spring 43 surrounding the valve stem 35 and confined between the partition 37 and the flange 40. The handle, through the medium of which the flush valve is operated, is represented at 44, the inner end of this handle, which is of enlarged diameter, as represented at 45, extending into the chamber 39 and engaging at its inner end with the opposing surface of the head 41. The various parts just described are so constructed and arranged, as shown, that the head 41 is held under spring tension by means of a coil spring 41ª located in the chamber 39 and confined between the partition 37 and the head 41, against the inner end of the handle 44, the latter being restrained against outward displacement, by the flange 46 of a gland 47 screwed upon the outer end of the casing section 28 and overlapping the enlarged portion 45 of the handle.

The chamber 38 is in constant communication with the outlet 10 through the medium of a tube 48 carried by the disk 26 and opening at one end thereof into the chamber 38 and at its opposite end into a passage 49 in the wall of the casing 8, the tube 48 extending into one end of this passage and the opposite end of this passage opening into the outlet 10. The gasket 29 contains an opening through which the tube 48 extends, and the gasket 30 contains an opening 50 registering with the opening in this tube, as shown.

The operation of the device is as follows: Water flowing from the supply thereof through the inlet 9 flows through the relatively small ports 21 and recess 22 into the bellows chamber, and as soon as the pressure of the water supplied thereto and built up in this chamber and exerted against the inner face of the disk 15, is sufficient to overcome the pressure of the water exerted against the opposite face of this disk (it being noted that the area presented by the inner face of the disk and subjected to the water pressure in the bellows chamber is greater than the area exposed to the inflowing water at the opposite face of this disk), the valve cooperating with the seat 14 closes, thereby closing the outlet 10 to the inlet 9.

The operation of the valve device, for producing the flushing, is effected by the operator tilting the handle 44, which operates to force the valve 33, in opposition to the spring 43, away from the seat 32 and thereby opening the bellows chamber to the chamber 38. The result of opening the valve 33 is to almost instantaneously relieve the pressure in the bellows chamber, the water under pressure therein escaping from this chamber through the boss 31, chamber 38, outlet pipe 48 and passage 49, into the outlet 10. The pressure of the water at the inlet 9 thereupon opens the valve cooperating with the seat 14, the bellows 23 contracting in this operation, and the flushing water thereupon flows from the inlet out through the outlet 10. The flushing water continues to flow through the outlet 10 until the water in passing through the ports 21 and recess 22 into the bellows chamber builds up a pressure therein sufficient to close the valve just referred to, assuming that the valve 33 has returned to normal closed position by the operator discontinuing manual pressure against the handle 44.

It will be noted from the foregoing that the valve controlling the flow of flushing water through the outlet 10 may be caused to open by momentarily-applied pressure to the handle 44 and that this valve closes slowly and automatically, it being observed that the outlet from the bellows chamber is of much greater cross-sectional area than the inlet thereto.

The feature of so constructing the parts of the device through the medium of which the valve 33 is operated, as shown and described, and involving the provision of the plurality of springs 43 and 41$^a$, is of advantage as the handle 44 is thereby tensioned to maintain it normally in a predetermined position, independently of the valve 33 and thus should the gasket 34 become packed or worn the spring 43 is free to compensate for such variations in the gasket, to ensure a tight valve joint.

It will be noted that in the particular construction shown the water in passing from the inlet 9 direct to the outlet 10 exerts a siphonic action on the water in the bellows chamber and thus accelerates the opening of the valve cooperating with the seat 14.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

A flush-valve comprising a casing containing an inlet and an outlet, a bellows-chamber having end walls located between, and in spaced relation to, the end walls of the casing, one of said end walls of said bellows-chamber being movable and the other containing an outlet for said chamber communicating with the space between said last referred to end wall and the adjacent end wall of said casing, a valve operatively connected with said movable wall and controlling communication between the inlet and outlet of said casing, said bellows-chamber containing an inlet in communication with said casing inlet, a valve controlling the outlet of said bellows-chamber, said casing containing a housing at one end thereof into which the stem of said last named valve extends, a stuffing-box located in said space in said casing and in which said stem is reciprocable, a spring in said housing yieldingly pressing said last named valve to its seat, and means for actuating said last named valve extending into said housing.

JAMES W. KELLY.